US005729328A

United States Patent [19]
Kimura et al.

[11] Patent Number: 5,729,328
[45] Date of Patent: Mar. 17, 1998

[54] PHOTOGRAPHIC FILM INSPECTION APPARATUS

[75] Inventors: Tsutomu Kimura; Junji Sugano, both of Kanagawa, Japan

[73] Assignee: Fuji Photo Film Co., Ltd., Kanagawa, Japan

[21] Appl. No.: 665,684

[22] Filed: Jun. 18, 1996

[30] Foreign Application Priority Data

Jul. 14, 1995 [JP] Japan .................................. 7-178571

[51] Int. Cl.$^6$ .......................... G03B 27/52; G03B 27/72
[52] U.S. Cl. .................................. 355/40; 355/41
[58] Field of Search ............................ 355/35, 36, 38, 355/40, 41, 42, 18, 75; 358/506, 527, 487

[56] References Cited

U.S. PATENT DOCUMENTS

| | | | |
|---|---|---|---|
| 5,400,152 | 3/1995 | Manico et al. | 355/38 |
| 5,546,196 | 8/1996 | Huot et al. | 355/40 |
| 5,555,073 | 9/1996 | Grossman et al. | 355/41 |
| 5,561,494 | 10/1996 | Terashita | 355/38 |
| 5,617,180 | 4/1997 | Yoshikawa | 355/40 |

*Primary Examiner*—A. A. Mathews
*Attorney, Agent, or Firm*—Sughrue, Mion, Zinn, Macpeak & Seas, PLLC

[57] ABSTRACT

A photographic film inspection apparatus for inspecting a photographic film before it undergoes exposure. The photographic film inspection apparatus includes an exposure condition reading unit for reading from the photographic film information regarding exposure conditions necessary for exposure including information regarding each picture frame, a digital image information capturing unit for dividing an image recorded on each picture frame of the photographic film into a plurality of pixels and for capturing them as data, an image presence/absence detection unit for detecting whether or not an image is recorded in a predetermined photographable area of the photographic film, an exposure condition calculation unit for calculating exposure conditions used during exposure based on the exposure condition information read by the exposure condition reading unit, and a digital image information correction unit for correcting the digital image information so as to permit images captured by the digital image information capturing unit to be properly reproduced on the photosensitive material though exposed under standard exposure conditions. With this structure, various inspection processes can be performed efficiently using a single inspection apparatus before printing images on a printing paper through exposure.

19 Claims, 7 Drawing Sheets

SWITCHING LEADING AND TAIL ENDS OF FILM

FIG. 7B

TURNING FILM INSIDE OUT

FIG. 7C

TURNING FILM INSIDE OUT + ORDINARY PROCESSING

PHOTOGRAPHIC FILM INSPECTION APPARATUS

BACKGROUND OF THE INVENTION

1. Field of the Invention

The present invention relates to a photographic film inspection apparatus for inspecting a photographic film before it undergoes exposure in order to obtain appropriate exposure conditions for the exposure in which light is irradiated onto a photosensitive material through the photographic film, thereby reproducing on the photosensitive material images recorded on the photographic film.

2. Description of the Related Art

Conventionally, when a laboratory receives a photographed film (e.g., a negative film), the presence or absence of an image is judged frame by frame (including the selection of images which have been too underexposed or overexposed to be printed). Each picture frame is notched as required, and each image to be printed is captured by a scanner. While the thus captured image is displayed in the Form of a positive image, the exposure conditions (correction values) are determined. The exposure conditions are recorded on an LSI card, and this LSI card is delivered to a printer together with the negative film. Subsequently, printing is performed.

Recently, a negative film provided with a magnetic recording layer has been proposed. In such a negative film, various kinds of information can be recorded on the magnetic recording layer as magnetic information. For example, information for specifying the negative film, photographing information for setting exposure conditions (e.g., whether or not strobe light was used and whether the film was photographed indoors or outdoors), and user information (the date and time of photographing and the locations of photographing) can be recorded on the magnetic recording layer.

When a negative film provided with such a magnetic recording layer is used, a process for reading magnetic information from the magnetic recording layer is also added to the above-described processing steps. In some case, it becomes necessary to further add to the processing steps a process for recording calculated exposure conditions on the magnetic recording layer.

It has recently been put forward that images recorded on one negative film are reproduced on a single photographic-paper-sized sheet in a matrix, whereby an index print is prepared. This index print allows a user to make a repeat order for copies of the photographs (hereinafter simply referred to as a "re-order" without the need to refer to the negative film. Further, the index print is helpful for the user when he or she puts photographs on a photo album, for example.

However, the above-described processes are carried out with different units (they may have an integrated appearance), and hence the overall system requires a large space. If the processes are independently carried out, it will be necessary to temporarily store the negative films for reasons of a difference in processing timing, which in turn leads to a lower working efficiency.

SUMMARY OF THE INVENTION

In view of the forgoing problems, an object of the present invention is to provide a photographic film inspection apparatus capable of totally controlling the necessary processing steps before carrying out a printing operation, while improving working efficiency by eliminating a difference in working time among processing steps.

According to a first aspect of the present invention, there as provided a photographic film inspection apparatus for inspecting a photographic film before it undergoes exposure in order to obtain appropriate exposure conditions for the exposure in which light is irradiated onto a photosensitive material through the photographic film, thereby reproducing on the photosensitive material images recorded on the photographic film. The photographic film inspection apparatus comprises exposure condition reading means for reading from the photographic film information regarding exposure conditions necessary for exposure including information regarding each picture frame, digital image information capturing means for dividing an image recorded on each picture frame of the photographic film into a plurality of pixels and for capturing them so as to output digital data representing the captured image, image presence/absence detection means for detecting whether or not an image is recorded in a predetermined photographable area of the photographic film, exposure condition calculation means for calculating exposure conditions used during exposure based on the exposure condition information read by the exposure condition reading means, and digital image information correction means for correcting the digital image information so as to permit images captured by the digital image information capturing means to be properly reproduced on the photosensitive material though exposed under standard exposure conditions.

With this arrangement, when images recorded on the photographic film are reproduced on the photosensitive material through exposure using light passing through the photographic film, the photographic film inspection apparatus provides proper exposure conditions.

The photographic film inspection apparatus is provided with the exposure condition reading means for reading from the photographic film exposure condition information necessary to carry out exposure. For example, a proper exposure amount correction value is determined through a comparison between a mean density of each picture frame (LATD) and a standard density. In other exposure condition setting methods, the image is detected for each of three primary colors, or the density of the characteristic portion of each image is used as a standard density.

In the photographic inspection apparatus, the image information capturing means captures the image information of each picture frame and converts it into digital data. The thus obtained digital data (digital image data) can be used for displaying on a monitor the image of each frame. The digital image data can be easily corrected by the image information correction means so that images on the negative film can be reproduced on the photosensitive material through exposure under the predetermined standard exposure conditions. When a plurality of images are printed at one time, the respective images can be properly printed even if some of them have been overexposed or underexposed.

In the photographic film inspection apparatus, the image presence/absence detection means judges whether or not an image is recorded in an area where the image is to be recorded.

When the exposure condition information is read by the exposure condition reading means, exposure conditions are calculated by the exposure condition calculation means.

As mentioned above, the photographic film inspection apparatus efficiently carries out, in a single system, various processes before the film undergoes exposure. As a result, for example, it is possible to decrease the number of operations for positioning each photographic film (i.e., it becomes unnecessary to position the photographic film every time the film is subjected to a different processing). Further, it is possible to complete the above-mentioned processing steps while the photographic film is conveyed along a predetermined transfer path once, thereby resulting in an improved work efficiency.

According to a second aspect of the present invention, the photographic film includes a magnetic recording layer, and some of the exposure conditions are recorded as magnetic information on the magnetic recording layer. The exposure condition reading means includes magnetic information reading means for reading out the magnetic information.

In the second aspect, magnetic information recorded on the magnetic recording layer of the photographic film is read out by the magnetic information reading means. For example, a magnetic head is fixedly disposed along a predetermined transfer path. Therefore, the magnetic information can be easily read out while the photographic film is conveyed at a constant speed along the predetermined transfer path.

According to a third aspect of the present invention, the photographic film includes a magnetic recording layer, and the photographic film inspection apparatus includes magnetic recording means for recording at least either exposure conditions calculated by the exposure condition calculation means or corrected image information provided by the digital image information correction means, as magnetic information.

In this aspect, the photographic film is provided with a magnetic recording layer, and magnetic information is recorded on the magnetic recording layer by means of the magnetic information recording means. The magnetic information comprises the exposure conditions, corrected digital image data, or the like. Similarly to the magnetic recording of the second aspect of the present invention, the magnetic information can be easily recorded on the magnetic recording layer by fixedly disposing a magnetic head along a predetermined transfer path, and conveying the photographic film at a constant speed along the transfer path.

According to a fourth aspect of the present invention, the photographic film inspection apparatus includes transmission means for sending the exposure conditions calculated by the exposure condition calculation means and the corrected digital image information provided by the digital image information correction means to a printer for printing images by carrying out exposure.

According to a fifth aspect of the present invention, the transmission means transmits information to the printer through on-line or in-line communications.

According to a sixth aspect of the present invention, the transmission means transmits information via a recording medium.

According to the fourth aspect, the transmission means has a function of transmitting the exposure conditions and the corrected digital image data to the printer using transmission means. When the transmission means is an on-line or in-line connection, information can be directly sent to the printer. When the recording medium is used, the information and the photographic film can be transported together, which renders special verification means unnecessary.

According to a seventh aspect of the present invention, the photographic film inspection apparatus includes an image processing function and display means for displaying a positive image on the basis of the exposure conditions calculated by the exposure condition calculation means and the corrected image information provided by the digital image information correction means.

According to the seventh aspect of the present invention, a positive image is displayed on the display means irrespective of the type of photographic film. This positive image is processed on the basis of the exposure conditions calculated by the exposure condition calculation means and the corrected image information provided by the digital image information correction means. Therefore, it becomes easier for an operator to recognize the state of the image displayed on the display means by viewing it.

According to an eighth aspect of the present invention, it is possible for the operator to see a picture (a positive image) substantially the same as the print image before the image is actually printed. Therefore, it becomes possible for the operator to correct the preset exposure conditions if they seem unsuitable for the current exposing processing.

In the eight aspect of the present invention, the photographic film inspection apparatus of the seventh aspect includes an operation key associated with the image processing function for use in changing the exposure conditions. The positive image displayed on the display means can be changed through operation of the operation key.

DESCRIPTION OF THE EMBODIMENT

Figure 1:
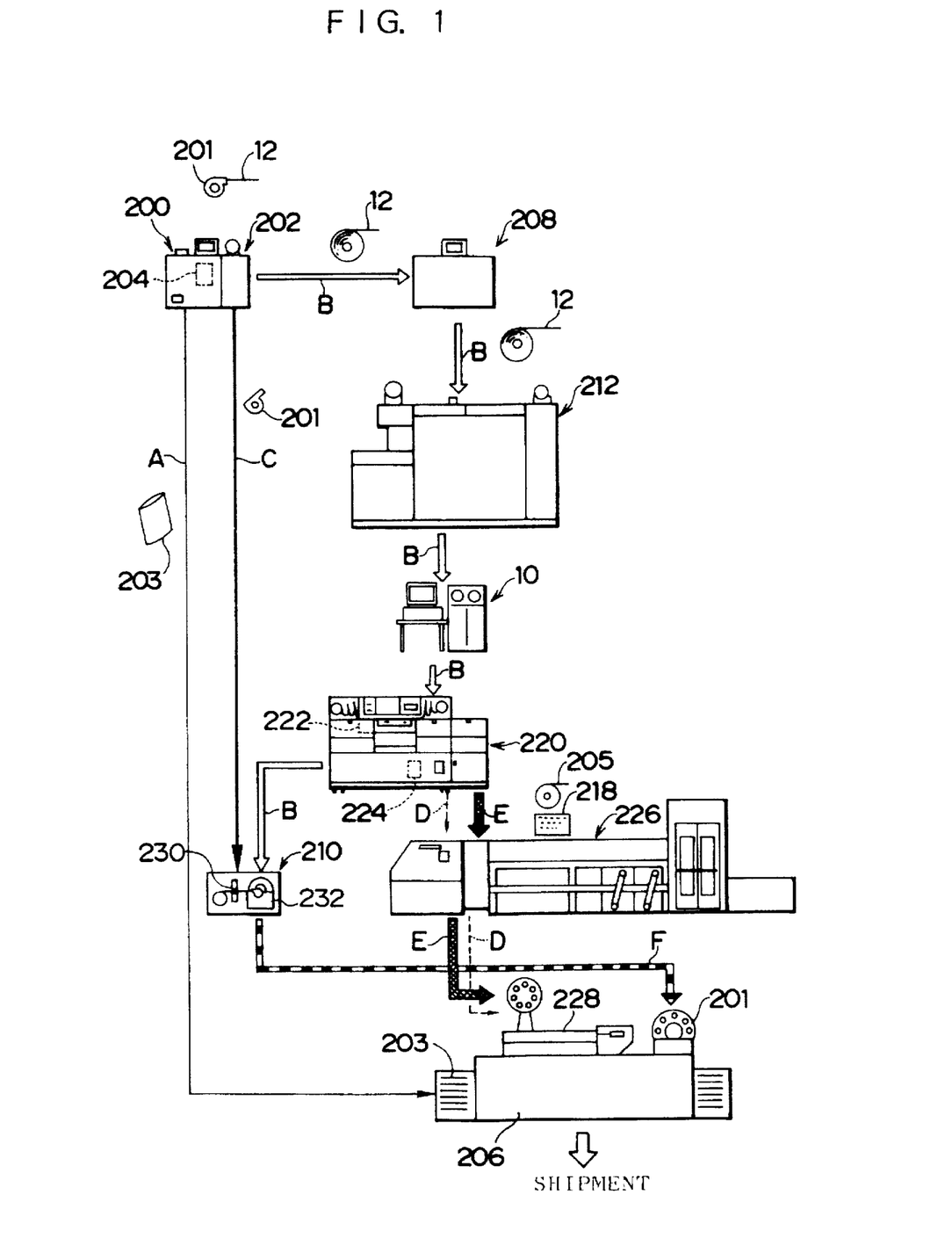
FIG. 1 is a diagram showing the overall structure of a photographic processing system according to an embodiment of the present invention.

FIG. 1 schematically shows equipment in a large laboratory for a new processing system as a photographic processing system according to an embodiment of the present invention. In the new processing system, a negative film 12 provided with a magnetic recording layer is used.

In the large laboratory, received films (which are contained in respective film cartridges 201) are successively joined together by a film splicer 200, so that a long rolled film 12 is formed.

When each film cartridge 201 is set to the film splicer 200, the film splicer 200 judges whether the film is of a negative type or of a positive type and whether the film is of a monochrome (BW) type or of a color type so as to avoid problems associated with development. If the film has been judged as one being suitable for a subsequent developing process, the film is taken out of the film cartridge 201 by rotating a spool shaft of the cartridge. A check is performed as to whether or not the film has been developed by detecting the amount of transmission light using, e.g., an infrared transmission sensor. When it is judged that the film 12 has not been developed, the film 12 is taken out further.

The film splicer 200 is provided with a detacher 202. When the film 12 has been completely taken out of the film cartridge 201, the trailing edge of the film 12 connected to the spool shaft within the film cartridge 201 is detached from the spool shaft. As a result, the film 12 is completely removed from the film cartridge 201, and the thus removed film 12 is joined to a preceding film.

When the film 12 is provided with a magnetic recording layer, an ID recorded on the film cartridge 201 is read, and the thus read ID is magnetically recorded on the magnetic recording layer of the film 12. On the film 12, an ID which is identical to that of the film cartridge is usually recorded. Therefore, the magnetically recorded ID is used as a backup ID.

The film cartridge 201 is usually fed to the film splicer 200 together with a so-called DP bag 203 provided by a photo-developing shop. This DP bag 203 is used after development and printing. That is, each cartridge 201 and prints 205 resulting from processes such as development and printing are returned to a customer using the DP bag 203. A debit note is also attached to the DP bag 203 containing the cartridge and prints. Accordingly, in the present embodiment, a printer 204 is disposed for reading the recorded ID of the film cartridge 201 and printing that ID on the DP bag 203. The ID on the DP bag 23 is compared with the ID of the film cartridge 201 or the like when the prints are finally shipped out of the laboratory. After the film cartridge 201 has been removed from the DP bag 203, the DP bag 203 is sent to a verification section 206 positioned prior to a shipping section as indicated by thin arrow A shown in FIG. 1.

After the film 12 and the film cartridge 201 have been separated from each other by the film splicer 200, the film 12 is transported to an inspection unit 208 (see thick white arrow B in FIG. 1), and the film cartridge 201 is sent to an attacher 210 (see thick arrow C in FIG. 1). After having checked the state of a joint between the films, the inspection unit 208 sends the film to a film processor 212. In the film processor 212, the film is conveyed to successively pass through a developing tank, a fixing tank, a washing tank, and the like. The film is then dried, whereby images appear on the film. The film having the images appearing thereon is taken up in a rolled form, and it is sent to a scanner 10.

In the scanner 10, the images recorded on the film 12 are captured by image pick-up elements such as CCDs, and exposure amount correction data are prepared on the basis of the thus captured image information. The image information is fed to an index print section (not shown) provided in the printer 220. The construction of this scanner 10 and its function will be described later.

The index print section is provided with a liquid crystal display panel (not shown) which displays an image on the basis of the image information (digital information). The liquid crystal display panel is designed so as to display five to ten images, and they are displayed in the present invention at one time. In the present embodiment, ten images (five by two) are displayed at one time.

Light of each of the primary colors (R, G and B) passes through the liquid crystal display panel, and an image is formed on a rolled printing paper as a result of exposure. By repeating this operation, images of one film are reproduced on a sheet in matrix. This sheet is called an index print 218, and it is provided to the customer together with the film cartridge 201 and photographs.

The printer 220 is provided with an ID reader 222 for reading an ID from the film 12. The ID of the film 12 is recorded on the index print 218 on the basis of the data read by the ID reader 222. The ID comprises bar codes and characters (numerals) together.

In the printer 220, the picture frames of the rolled film 12 are positioned at a print position one by one, and the image of each frame of the film is printed on the printing paper 205 with a predetermined amount of light. The images are printed on the printing paper 205 in sequence by repeatedly carrying out the above operation. The index print section is designed to continuously prepare the index print 218 every time the printing process for one film 12 has been completed.

The printer 220 is further provided with an ID printer 224 for printing the ID read by the ID reader 222 on the front or reverse side of each picture frame of the printing paper 205. The ID is printed while the image of each picture frame is printed on the printing paper.

After the printing process, each film is sent to an attacher 210 so as to return it to the customer. The printing paper 205 and the index print 218 are conveyed to a paper processor 226 (indicated by hatched arrow E and dotted arrow D in FIG. 1), and they are subjected to development therein.

In the paper processor 226, the printed printing paper 205 undergoes developing, fixing, washing, drying, etc., in sequence. Subsequently, the rolled printing paper 205 is conveyed as it is to a paper cutter 228.

The rolled film 12, which has undergone the development and printing and other processes, is set in the attacher 210, and the film cartridges 201 are set in the order in which the films were joined. Since the empty film cartridge are put into a stocker in the order in which the films were joined by the splicer, they can be easily held in the same order as that of the films. If the stocker corresponds to the lot of the films, it becomes easy to perform verification and to transport the empty film cartridges.

An ID number reader 230 is disposed along the transport path for the rolled film 12. The rolled film 12 is set to the attacher 210, and is taken out from the outermost layer thereof for the transport along the path. An ID number reader 232 is also disposed at a position where the film cartridge 201 is set for reading the ID thereof.

The film cartridges 201 are set to the attacher 210 in the order in which the films are joined, and therefore they are usually put in the same order as that of the films 12. However, the film cartridges may get out of order as a result of a mistake during transport. The match between the film and the film cartridge is verified by comparing both the IDs of the film and the film cartridge. If the IDs match with each other, the joint between the films 12 is disconnected, and each film having an original long length is housed in the corresponding film cartridge 201. As a result, operation for cutting each film 12 can be omitted.

As indicated by striped arrow F in FIG. 1, the film cartridge 201, into which the film 12 has been placed, is transported to the verification section 206. The DP bag 203 is also sent to the verification section 206.

At the verification station 206, the IDs recorded on the DP bag 203, the film cartridge 201, the printing paper 205, and the index print 218 are compared with each other. If the IDs match with each other, the film cartridge 201, the photographic print 205, and the index print 218 are packed in the DP bag 203 for shipment.

Figure 2:
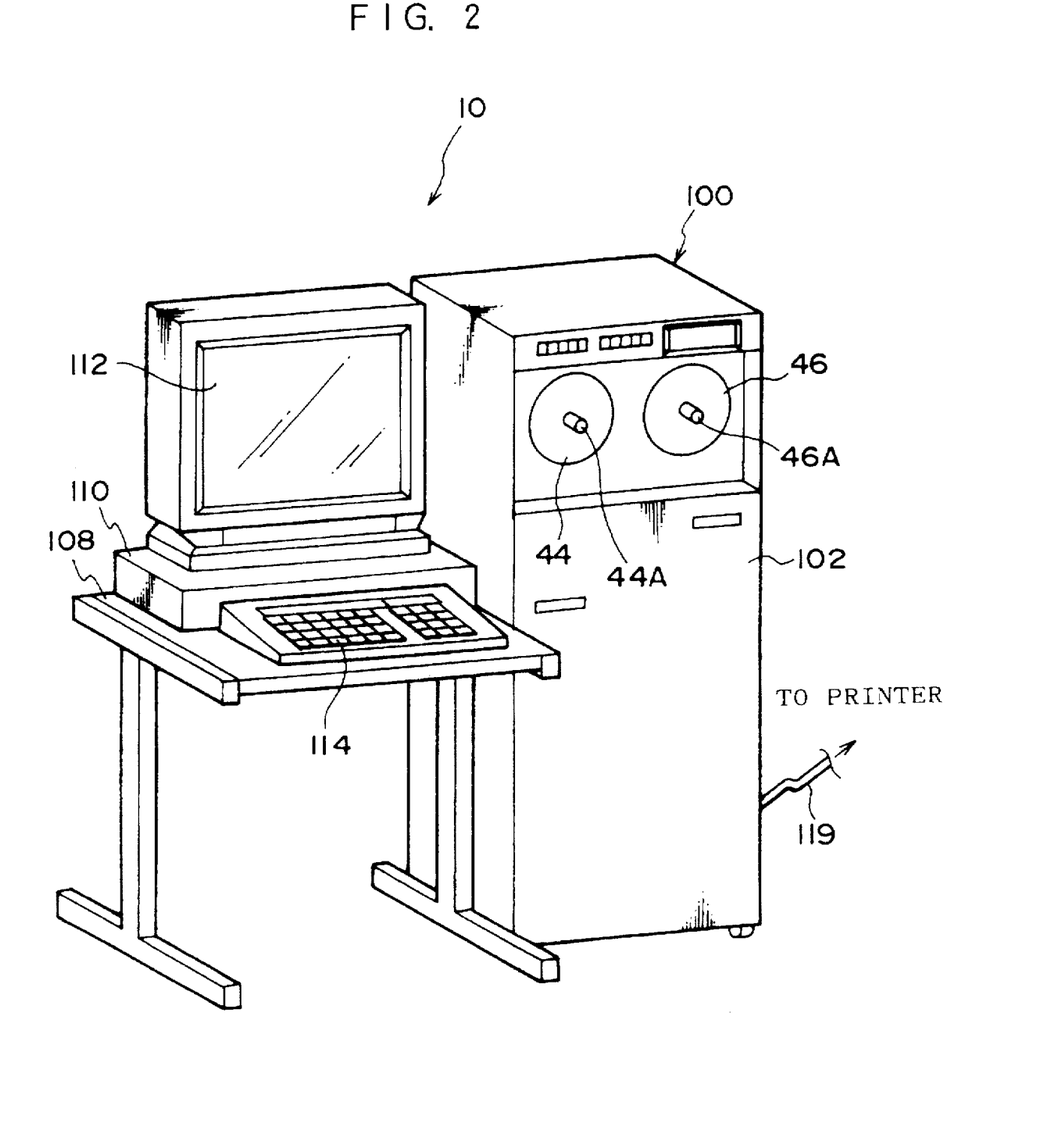
FIG. 2 is an external view of a scanner used in the photographic film inspection apparatus according to the present embodiment.
Figure 3:
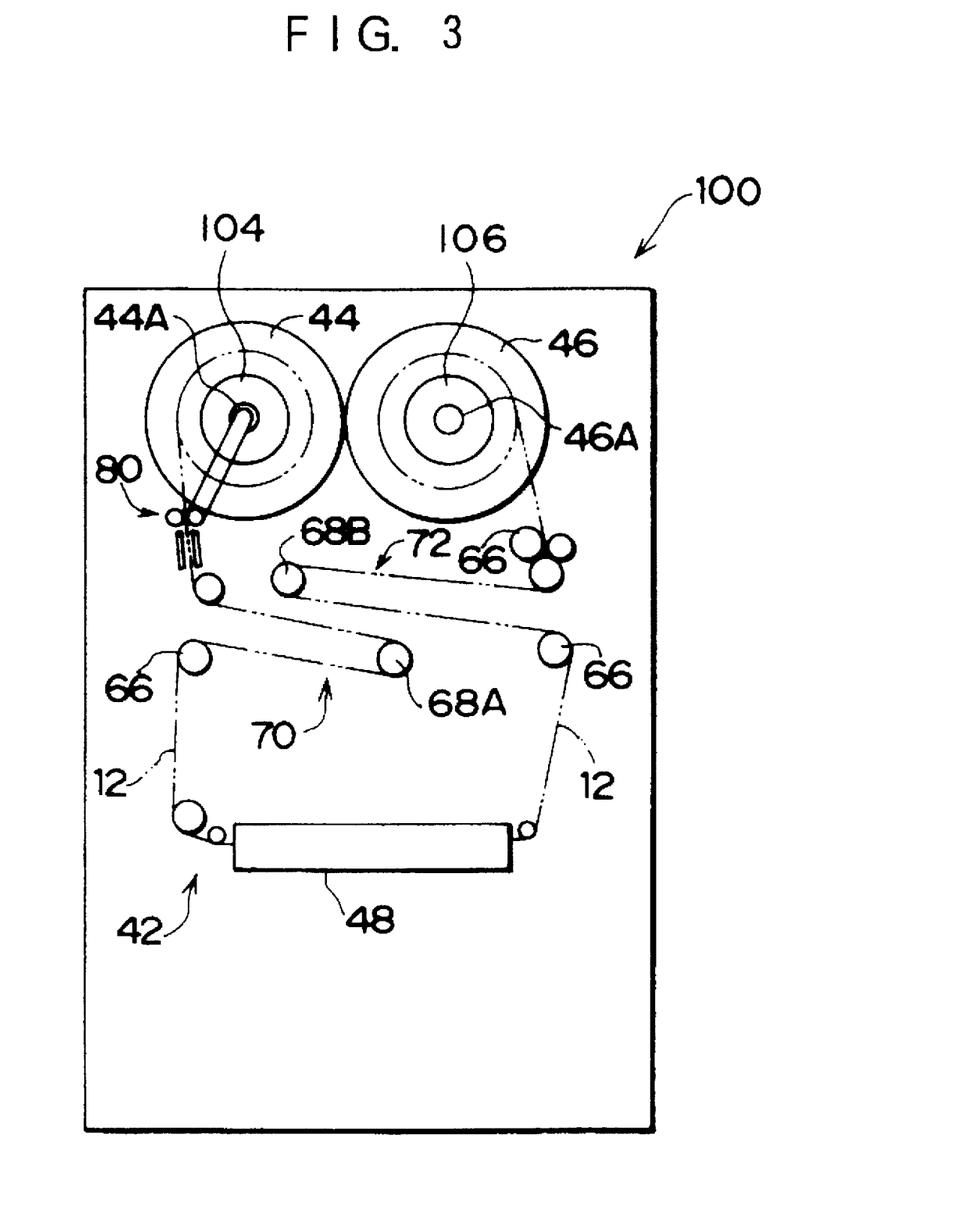
FIG. 3 is a front view of the scanner according to the present embodiment.
Figure 4:
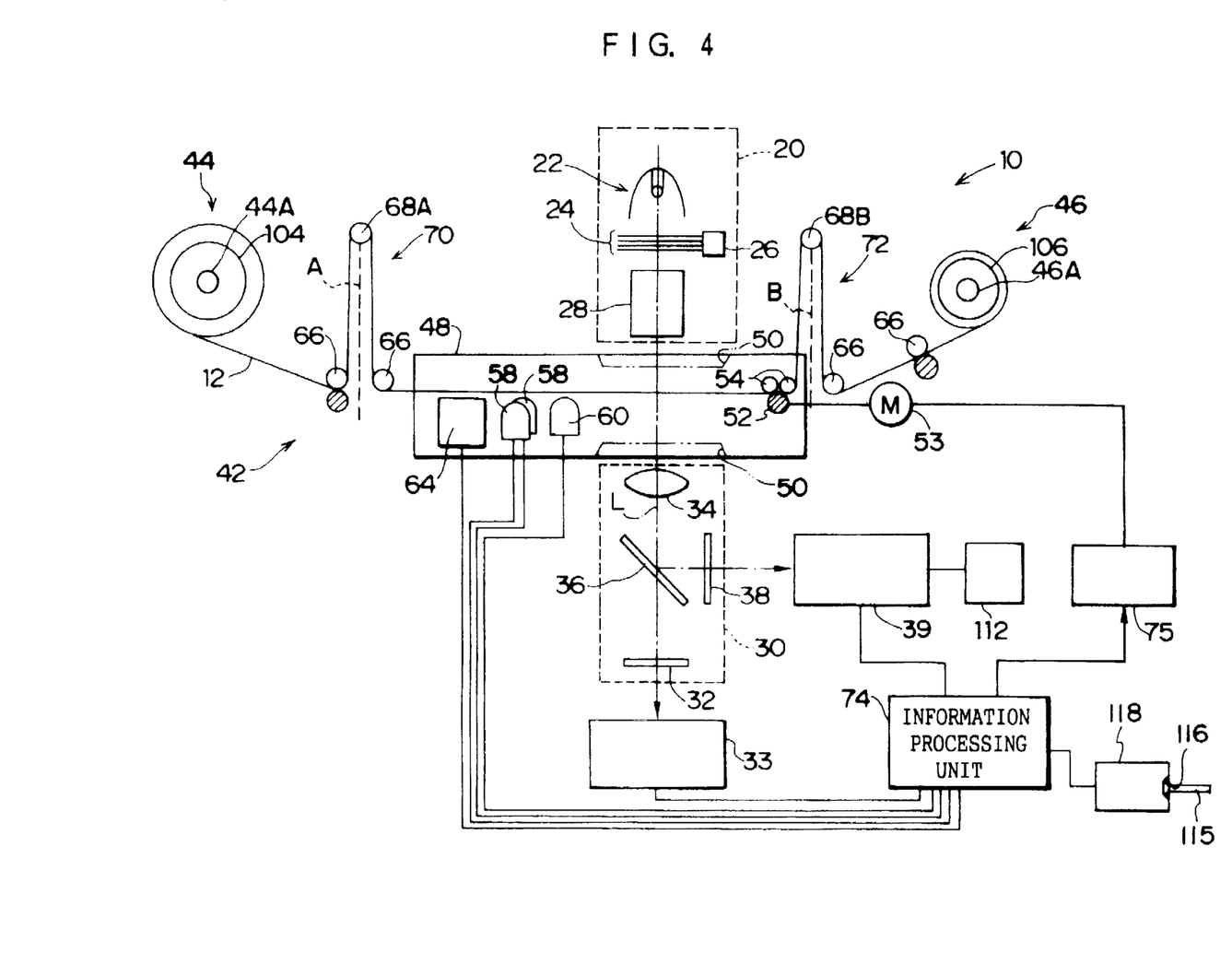
FIG. 4 is a diagram schematically showing the structure of the scanner according to the present embodiment.

FIGS. 2 to 4 show the scanner 10 used in the present invention. FIG. 2 is an external view of the scanner 10, FIG. 3 is a front view of the scanner 10 mainly showing a transport section 42, and FIG. 4 is a schematic diagram of the scanner 10 shown in FIG. 3.

As shown in FIG. 2, a scanner main unit 100 is covered with a vertically extending box-shaped casing 102, and a feed reel 44 and a take-up reel 46 are attached to a front upper portion of the main body. A core 104 (shown in FIG. 3) is designed so as to be attached to a shaft 44A of the supply reel 44 for taking up the negative film 12 in a rolled form. The rolled negative film 12 comprises a plurality of negative films 12 which are continuously joined together so that a total of about 2000 images are recorded on the rolled negative film 12. This rolled negative film 12 is continuously fed to the scanner main unit 100, and it is then processed. A shaft 46A of the take-up reel 46 is designed so as to receive only a core 106, and the negative film 12 continuously fed from the supply reel 44 is taken up by the core 106.

A table 108 is disposed on the left side of the scanner main unit 100 as shown in FIG. 2, and a control unit 110, a monitor 112, and a keyboard 114 are placed on top of the table 108.

The monitor 112 laid on the control unit 110 displays the images recorded on the negative film 12 in the form of a positive image. An operator visually checks the positive image displayed on the monitor 112, and enters a correction value for exposure amount correction values automatically determined by the scanner 10.

The control unit 110 is connected to a printer 220 provided in the subsequent stage, thereby establishing a on-line connection, which permits the image information captured by the scanner main unit 100 and the exposure amount correction information for each image to be sent directly to the printer. The control unit 110 is further provided with a slot 116 into which an LSI card 115 shown in FIG. 4 is inserted. The LSI card 115 inserted into the slot 116 is received by a card drive 118 (shown in FIG. 4) within the control unit 110, and information is written into or read from the LSI card 115. In the present embodiment, a negative film lot number and information For calculating fees are recorded on the LSI card 115, and this LSI card 115 is sent to the printer together with the rolled negative film 12 wound around the take-up reel 46.

The information (e.g., exposure amount correction information), which is calculated by the scanner 10 and is required by the printer, is transmitted as on-line data to the printer through a signal line 119.

As shown in FIGS. 2 and 4, the scanner main unit 100 includes a light source section 20 dedicated for photometry, a sensor section 30 for capturing and analyzing images recorded on the negative film 12, and the transport section 42 for sending the negative film 12.

The supply reel 44 provided on the left of FIG. 4 (on the top left of FIG. 2) is provided with the negative film 12 wound, in a layered form, around the core 104 attached to the shaft 44A. The negative film 12 is transported through the transport section 42 and is taken up in a layered form by the core 106 attached to the shaft 46B of the take-up reel 46, which is disposed on the right side of FIG. 4 (on the top right of FIG. 2), while passing through a negative film carrier 48 disposed in the course of the path of the transport section 42.

Figure 5:
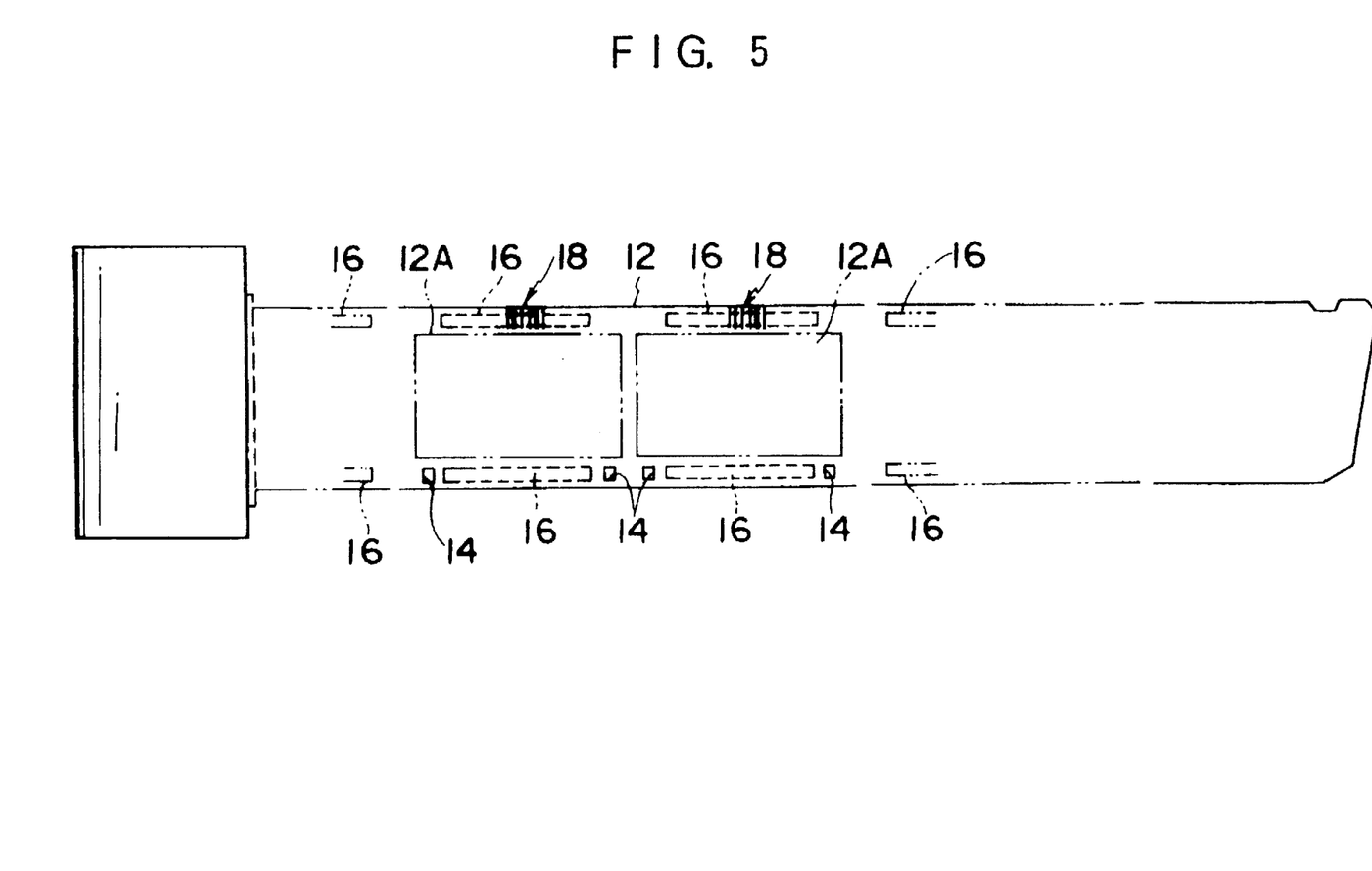
FIG. 5 is a partial plan view of a negative film usable in the present invention.

As shown in FIG. 5, the negative film 12 used for this scanner 10 comprises a plurality of picture frames 12A having images recorded thereon which are arranged at predetermined intervals in a longitudinal direction of the film. The negative film 12 has perforations 14, or more specifically, a pair of perforations 14 are formed for each picture frame 12A along one lateral side edge of the film such that one perforation is aligned with one longitudinal end of the picture frame and the other perforation is aligned with the other longitudinal end of the same. By virtue of these perforations, it is possible to discriminate between the front and back of the negative film 12 and to identify the position of each picture frame 12A.

Magnetic tracks 16 on which magnetic information is to be recorded are provided along both lateral sides of each picture frame 12A between the perforation pairs 14.

These magnetic tracks 16 are formed on the back of the negative film 12 which faces outside when the film is taken up. A various kinds of information, such as photographing information regarding the image recorded on each picture frame 12A, a print size required to print the image, and exposure conditions, are recorded on the magnetic tracks. On the magnetic track 16 at the lateral side of the picture frame 12A opposite to the perforations 14, photographing information is recorded by a photographing apparatus such as a camera. Further, a bar code 18 representing a DX code is recorded along the lateral side of the negative film 12 opposite to the lateral side provided with the perforations 14, which makes it possible to specify the type of the negative film 12.

As shown in FIG. 4, the light source section 20 dedicated for photometry provided in the scanner main unit 100 has a light source 22 consisting of a halogen lamp and a reflector. A filter unit 24 consisting of filters for cutting the respective primary colors, i.e., C (cyan), M (magenta), and Y (yellow), and an ND filter for controlling an amount of light, is disposed in an optical path L of a light beam from the light source 22. Each filter of the filter unit 24 is advanced into and retracted from the optical path L in response to signals from a driver 26.

The negative film carrier 48 is disposed in the optical path L such that it is situated below the filter unit 24 with a light scattering tube 28 between them, as shown in FIG. 4.

The magnetic film 12 transported to the negative film carrier 48 is held between a transfer roller 52 rotated by a drive motor 58 which forwardly or reversely rotates, and press rollers (slave rollers) 54 disposed opposite to the transfer roller 52. The transfer roller 52 is under control of a transport control unit 75 so as to intermittently convey the negative film when the negative film is fed from the supply reel 44 to the take-up reel 46 but to feed the negative film at a constant speed when the film it fed from the take-up reel 46 to the supply reel 44.

An exposure amount calculation sensor 32 is disposed in the optical path L below the negative film carrier 48, as shown in FIG. 4. The exposure amount calculation sensor 32 comprises CCD elements which are arranged in a 256×256 matrix of pixels. The exposure amount calculation sensor 32 is connected to an exposure amount calculation unit 33, and the density of each color is calculated on the basis of the image data acquired by the CCD elements. The calculated color density is input to an information processing unit 74 connected to the exposure amount calculation unit 33.

A lens 34 and a half mirror 36 are disposed between the negative film carrier 48 and the exposure amount calculation sensor 32. The lens 34 is arranged so that it can be moved along the optical path L, which permits the modification of magnification.

The half mirror 36 transmits and reflects the transmission image of the negative film 12. The reflected transmission image arrives at a video sensor 38.

The video sensor 38 is made of a CCD sensor consisting of pixels arranged in a 640×480 matrix, and captures images recorded on the negative film 12. The video sensor 38 is connected to the monitor 112 via an image processing unit 39 within the control unit 110. The image captured by the CCD elements can be corrected by correction values entered through the keyboard 114. The image processing unit 39 is connected to the information processing unit 74 in the control unit 110, and the corrected image information is input to the information processing unit 74.

Figure 6A:
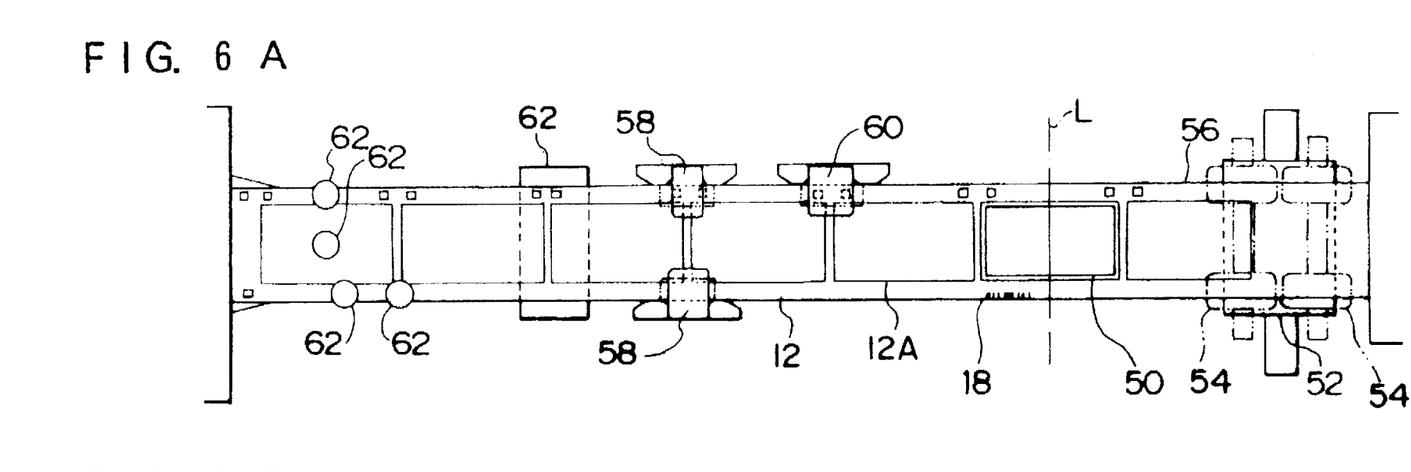
FIG. 6A is a plan view showing a transfer path of a negative film carrier and surrounding areas thereof.
Figure 6B:
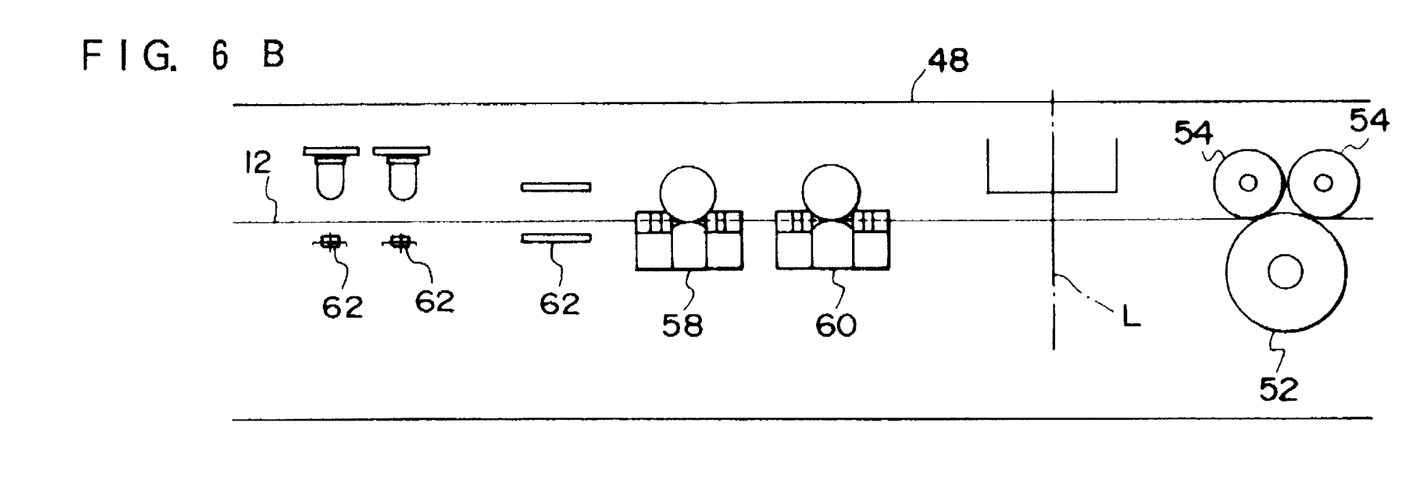
FIG. 6B is a cross-sectional view of the transfer path of the negative film carrier and surrounding areas thereof.

The negative film carrier 48 will now be described with reference to FIGS. 6A and 6B.

An aperture 50 is formed at the center of the negative film carrier 48 so as to permit light L from the light source 20 (see FIG. 4) to pass therethrough. As a result, when the light L passes through the negative film carrier 48, the light can reaches the sensor section 30 (see FIG. 4) while passing through the picture frame 12A of the negative film 12 positioned at the aperture 50.

The negative film carrier 48 is provided with a transfer path 56, and the negative film 12 travels along this path. When the negative film 12 travels along the transfer path, the picture frames 12A of the negative film 12 is guided to the aperture 50 one by one. The transfer path 56 has substantially the same width as the negative film 12 so as to make it possible to prevent the negative film 12 from becoming misaligned in a lateral direction of the transfer path and to ensure correct guiding of the film.

Read heads 58 are disposed along the lateral sides of the transfer path 56 upstream of the aperture 50 of the negative film carrier 48 in the direction in which the negative film is conveyed. The read heads 58 are positioned such that their head surfaces face upwards (see FIG. 4). When the negative film 12 is conveyed over the transfer path 56, the read heads 58 come into slidable contact with the magnetic tracks 16 (see FIG. 5) provided on both lateral side edges of the negative film 12, whereby the magnetic information recorded on the magnetic tracks 16 are read.

One of the read heads 58 reads print information which is recorded on one of the magnetic tracks 16 of the picture frame 12A so as to be read for a re-order. The other read head 58 reads camera information recorded on the other magnetic track 16 of the picture frame 12A.

The read heads 58 are disposed so as to be situated between the two adjacent picture frames 12A when the picture frame 12A is positioned at the aperture 50 for photometry. When the negative film 12 is intermittently transferred From the supply reel 44 to the take-up reel 46 (i.e., when the negative film is fed to the take-up reel) so as to carry out photometry for the picture frame 12A of the negative film 12, it becomes possible to read the magnetic information of one picture frame by conveying the film over a distance corresponding to the length of each picture frame after the completion of the photometry.

A record head 60 is disposed substantially at the Longitudinal center of the transfer path 56 of the negative film carrier 48. The record head 60 is disposed along one lateral side edge of the transfer path 56, and is connected to the information processing unit 74 (see FIG. 4). The record head 60 comes into slidable contact with the magnetic track 16 of the negative film 12 when the negative film 12 is conveyed back to the supply reel at a constant speed, whereby exposure amount correction data obtained as a result of the photometry are recorded. Specifically, the record head 60 records the exposure amount correction data obtained as a result of the photometry of the picture frame carried out while the film is fed to the take-up reel. In the case of a re-order, the thus recorded data are read by the read head 58 disposed along the same lateral side of the film as the recording head 60. In this way, the recorded data are used again.

The negative film carrier 48 is further provided with an optical sensor unit 64 which is disposed upstream with respect to the read heads 58 in tile direction in which the negative film is conveyed. The optical sensor unit 64 consists of a plurality of optical sensors 62. The optical sensor unit 64 detects the spliced portion of the negative film 12, as well as the perforations 14 formed in the negative film 12. The thus detected information is sent to the information processing unit 74. The information processing unit 74 specifies one negative film based on the information, as well as the picture frames 12A. The information processing unit 74 sends the information to the transport control unit 75 to which the information processing unit 74 is connected. On the basis of the received information, the transport control unit 75 controls the rotation of the transfer roller 52 via the motor 53 so as to accurately position each picture frame 12A at the aperture 50.

A sensor 62 detects the bar code 18 provided on the negative film 12, and the information processing unit 74 specifies the ID number of that negative film 12 on the basis of the detected information. Further, the sensor 62 measures the density of each image recorded in the picture frame 12A. It becomes possible for the information processing unit 74 to detect the size of the picture frame 12A, the leading end picture frame 12A, and trailing end picture frame 12A, based on the result of the measurement. Another sensor 62 detects whether or not an image is recorded on the picture frame 12A, which makes it possible for the information processing unit 74 to detect a blank picture frame.

The transfer roller 52 driven by the drive motor 53 is disposed on the transfer path 56 downstream with respect to the aperture 50 in the direction in which the negative film 12 is conveyed. The transfer roller 52 conveys the negative film 12 at a predetermined rate while the negative film 12 is held between the transfer roller 52 and the press rollers 54 positioned opposite to the transfer roller. The drive motor 53 is connected to the information processing unit 74 via the transport control unit 75. The transfer roller 52 intermittently conveys the negative film 12 so that each picture frame 12A can be positioned at the aperture 50 during the feeding of the film to the take-up reel. On the other hand, the transfer roller 52 conveys the negative film 12 at a constant speed by one rolled negative film 12 back to the supply reel at a constant speed.

If the negative film carrier 48 is supplied with the negative film 12, the transfer roller 52 intermittently conveys the negative film 12 during the feeding of the negative film to the take-up reel, whereby each picture frame 12A is positioned at the aperture 50. The image of the positioned picture frame is subjected to photometry using light from the light source 20.

At the time of intermittent transportation of the film, the optical sensor unit 64 reads a various kinds of optical information from another picture frame 12A, and the read head 58 reads magnetic information of another picture frame.

As shown in FIG. 4, one rolled negative film 12 wound around the take-up reel 46 is conveyed back to the supply reel at a constant speed over the transfer path 56. At this time, the record head 60 comes into slidable contact with the magnetic film 12 at a constant speed, whereby the information resulting from the photometry is recorded on the magnetic track 16.

The transport section 42 which transports the negative film 12 is provided with a plurality of slave rollers 66 and a plurality of reservoir rollers 68A and 68B (some of the slave rollers 66 are omitted from FIG. 4, and the positions of the respective rollers are diagrammatically illustrated).

The reservoir rollers 68A and 68B are respectively disposed between the two slave rollers 66 (see FIG. 4), as well as being connected to a loading control unit (not shown). These reservoir rollers are designed so as to move along a predetermined travel path in accordance with an instruction from the loading control unit.

The reservoir roller 68A is disposed between the supply reel 44 and the negative film carrier 48, and it travels along the path designated by a chain line A shown in FIG. 4 from one end to the other end so as to push the negative film 12, whereby a reservoir control section 70 is formed. The reservoir control section 70 absorbs a difference between a feed rate at which the negative film 12 is fed from the supply reel 44 and a feed rate of the negative film carrier 48, so that substantially constant film reservoir is maintained.

The reservoir roller 68B is positioned between the negative film carrier 48 and the take-up reel 46, and it moves along the path indicated by chain line B shown in FIG. 4 from one end to the other. As a result of the movement, another reservoir control section 72 is formed which absorbs a difference between the feed rate at which the negative film 12 is fed by the negative film carrier 48 and a feed rate at which the negative film 12 is taken up by the take-up reel 46, so that substantially constant film reservoir is maintained.

The reservoir rollers 68 are retracted from the transportation unit 42, through which the negative film 12 is conveyed, to their initial positions (the lowermost positions of the paths indicated by chain lines A and B shown in FIG. 4) when the system performs an automatic loading operation.

In the automatic loading operation, transport of the negative film 12 is started at a constant speed after the negative film 12 has been loaded on the supply reel 44 and fed to a supply path 88, which will be described later, and the transport of the negative film 12 is continued until the first picture frame 12A of the first negative film 12 is positioned for photometry in the negative film carrier 48.

The operation of the photographic film inspection apparatus of the present embodiment will now be described.
(Automatic Loading)

The negative film 12 wound, in a rolled form, around a core 104 is loaded on the supply reel 44 of the scanner main unit 100. After the negative film 12 has been loaded, the leading end of the negative film 12 is taken out of the outermost layer thereof and is guided to a predetermined position. After that, the automatic loading of the film is started. By means of the automatic loading operation, the leading edge of the negative film 12 first arrives at the reservoir control section 70. At this time, the reservoir roller 68A is situated at the lowermost position of the path indicated by chain line A shown in FIG. 4. The reservoir roller 68A is retracted from the transfer path of the negative film 12, and hence the negative film 12 smoothly passes through the reservoir control section 70.

After having passed through the reservoir control section 70, the negative film 12 arrives at the negative film carrier 48. Then, the negative film 12 is conveyed along the transfer path of the negative film carrier 48 while it is held between the transfer rollers 54 and 52. Upon receipt of a conveying force resulting from the rotations of the transfer rollers, the negative film 12 is fed out of the negative film carrier 48. The reservoir control section 72 receives the negative film 12 fed from the negative film carrier 48. The reservoir roller 68B of the reservoir control section 72 has already moved to the lowermost position in the path indicated by chain line B shown in FIG. 4, and it is retracted from the transfer path of the negative film 12. The negative film 12 smoothly passes through the reservoir control section 72.

After having passed through the reservoir control section 72, the negative film 12 is conveyed by the slave rollers 68 while being held thereby, and the thus conveyed negative film is then wound around the core 106 attached to the take-up reel.

The automatic loading operation is now completed, and the photometry of the images recorded on the negative film 12 is started frame by frame.
(Reading of Magnetic Information)

After the completion of the automatic loading operation, the photographic film inspection apparatus enters a standby state. The transfer of the negative film 12 is started, and the optical sensor unit 64 detects the perforations 14 that represent the position of each picture frame 12A. As a result, each picture frame 12A is positioned at the aperture 50. In other words, the negative film 12 is intermittently conveyed (the film is fed toward the take-up reel) over a distance corresponding to the frame pitch at a time. During the course of the intermittent conveyance of the magnetic film, the read head 58 reads the magnetic information recorded on the magnetic track 16 associated with the picture frame 12A. When the negative film 12 is stopped (positioned), the read head 58 is situated between the picture frames. Therefore, it is possible for the read head 50 to read the magnetic information of each picture frame.
(Photometry)

Procedures for photometry for each picture frame will now be described.

A certain picture frame is positioned at the aperture 50 of the negative film carrier 48. When light from the light source 20 is irradiated onto the picture frame, light passes through the picture frame, so that a transmission image is formed. The transmission image passed through the lens 34 is transmitted and reflected by the half mirror 36.

The light passed through the image is detected by the exposure amount calculation sensor 32, and the exposure amount calculation unit 38 calculates the density of each color on the basis of the data on the photographed image. The calculated color density is inputted to the information processing unit 74 connected to the exposure amount calculation unit 33.

On the other hand, the light reflected from the half mirror 36 is detected by the video sensor 38, and an image corresponding to the image data processed by the image processing unit 39 (i.e., the image data obtained by correcting the exposure amount of each color by the exposure amount calculation unit 33) is displayed on the monitor 112. When the operator enters correction values through the keyboard 11 while observing the image on the monitor 112, the image corrected in accordance with the signal output from the information processing unit 74 is displayed on the monitor 112.
(Recording of Magnetic Information)

After the completion of the photometry of all the picture frames 12A of one film, the exposure amount correction values are determined on the basis of the read magnetic information and the results of the photometry. When the exposure amount correction values have been determined for all of the negative films 12 in one rolled negative film 12, an instruction is issued to reverse the direction of transfer. The negative film 12 is conveyed at a constant speed (while being returned to the supply reel) over the transfer path 56 of the negative film carrier 48. The exposure amount correction values corresponding to the respective picture frames 12A are recorded on the magnetic head 16 by means of the record head 60.

When the photometry for each picture frame is completed, most of the negative film 12 is taken up by the take-up reel 46. The negative film 12 is then returned so as to be wound around the supply reel 44 again. At this time, a constant transfer speed is maintained, and the photometric data are recorded on the magnetic recording layer 16 by means of the record head 60 disposed on the negative film carrier 48. When the take-up operation involving the magnetic recording of the photometric data is completed, the negative film 12 is all wound around the supply reel 44, and the operation is now completed.

In this way, the scanner 10 of the present embodiment intermittently feeds the negative film 12 from the supply reel 44 to the take-up reel 46, but feeds it at a constant speed from the take-up reel 46 to the supply reel 44. As a result, it becomes possible to carry out the detection of the presence or absence of an image on the negative film 12, the inspection of the images recorded on the negative film 12 by converting them into positive images, reading of the magnetic information from the magnetic recording layer 16 provided on the negative film 12, capturing of the image information to prepare the index print, and intensive transmission of data required by the printer.

(Alternation of Winding Direction)

In addition to the above described common function, it is possible for the scanner 10 to change the direction in which the negative film 12 is taken up by the cores 104 or 106 in order to speed up the post-processing.

In other words, the negative film can be taken up by the core 104 or 106 in four different ways. Namely, in the first and second ways, the negative film is wound such that the leading end or the trailing end of the negative film 12 is positioned on the outermost layer. In the third and fourth ways, the negative film is wound such that the emulsion-coated layer faces inside or outside.

Figure 7A:
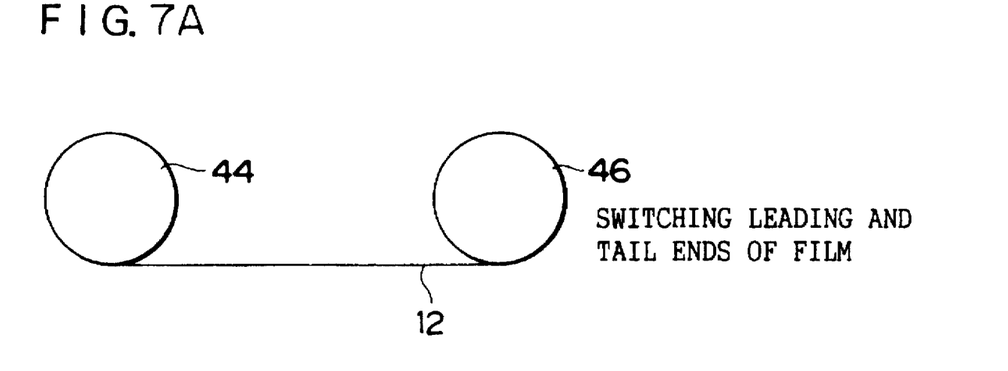
FIG. 7A is a diagrammatic illustration showing a film winding operation for switching the leading end and the trailing end of a negative film.
Figure 7B:
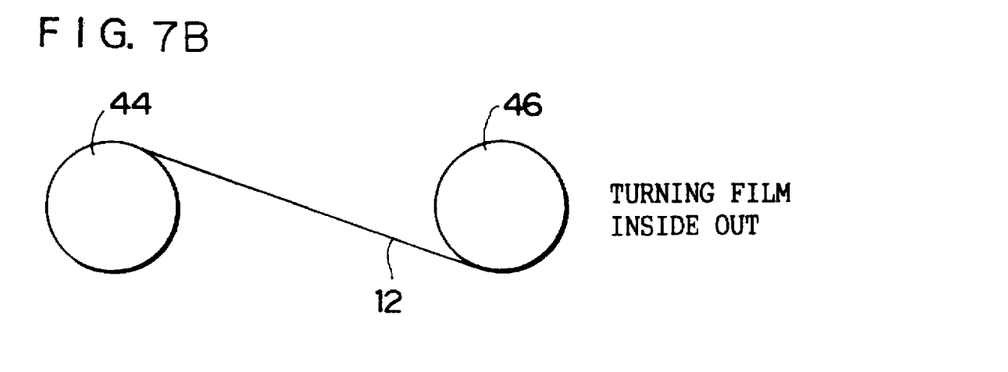
FIG. 7B is a diagrammatic illustration showing a film winding operation for turning a negative film inside out.
Figure 7C:
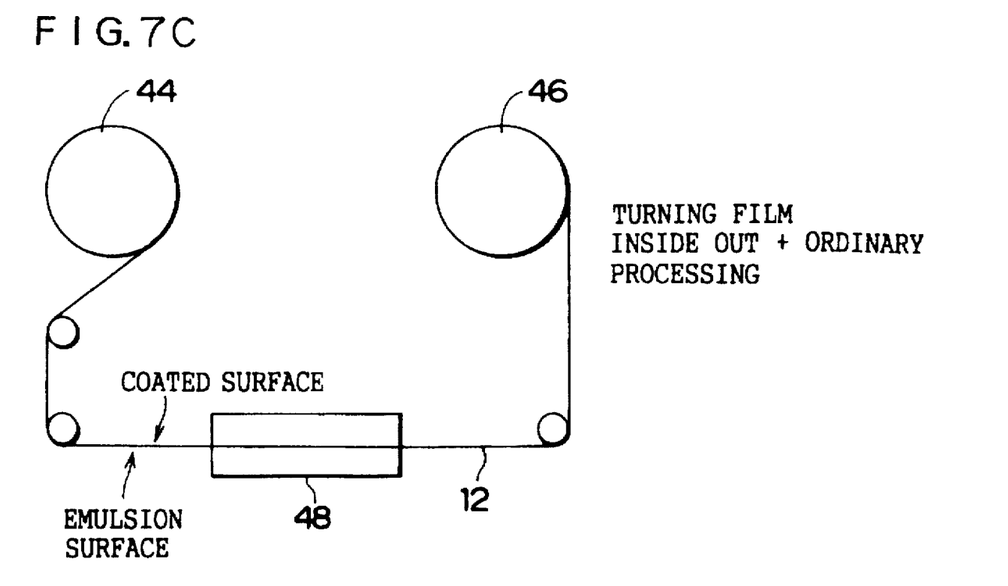
FIG. 7C is a diagrammatic illustration showing a film winding operation for turning a negative film inside out while scanning the negative film.

In order to perform winding in the first or second ways in which the leading end or the trailing end of the negative film 12 is positioned on the outermost layer, the negative film 12 is directly wound from the supply reel 44 to the take-up reel 46 (without passing through the negative film carrier 48) immediately after the completion of the forward and backward feeds of the negative film 12 (see FIG. 7A). In order to perform winding in the third or fourth ways in which the facing direction of the emulsion-coated layer is changed, the negative film 12 is taken out of the supply reel 44 which rotates in the clockwise direction and is taken up by the take-up reel 46 which rotates in the counterclockwise direction (FIG. 7B). When the above-described photometry and the recording and reading of magnetic information are carried out simultaneously with the winding of the negative film in the third or forth manners, it is necessary to consider the direction of the negative film 12 on the negative film carrier 48.

What is claimed is:

1. A photographic film inspection apparatus for inspecting a photographic film before it undergoes exposure in order to obtain appropriate exposure conditions for the exposure in which light is irradiated onto a photosensitive material through the photographic film, thereby reproducing on the photosensitive material images recorded on the photographic film, said photographic film inspection apparatus comprising:

exposure condition reading means for reading from said photographic film information regarding exposure conditions necessary for exposure including information regarding each picture frame;

digital image information capturing means for dividing an image recorded on each picture frame of said photographic film into a plurality of pixels and for capturing them so as to output digital data representing the captured image;

image presence/absence detection means for detecting whether or not an image is recorded in a predetermined photographable area of said photographic film;

exposure condition calculation means for calculating exposure conditions used during exposure based on the exposure condition information read by said exposure condition reading means; and digital image information correction means for correcting the digital image information so as to permit images captured by said digital image information capturing means to be properly reproduced on the photosensitive material though exposed under standard exposure conditions.

2. A photographic film inspection apparatus according to claim 1, wherein said photographic film is provided with a magnetic recording layer on which said exposure conditions have been partially recorded as magnetic information, and said exposure condition reading means comprises magnetic information reading means for reading out the magnetic information.

3. A photographic film inspection apparatus according to claim 1, wherein said photographic film is provided with a magnetic recording layer, and magnetic recording means is further provided so as to record on the magnetic recording layer at least either exposure conditions calculated by said exposure condition calculation means or corrected image information obtained by said digital image information correction means, as magnetic information.

4. A photographic film inspection apparatus according to claim 2, wherein said photographic film is provided with a second magnetic recording layer, and magnetic recording means is further provided so as to record on the second magnetic recording layer at least either exposure conditions calculated by said exposure condition calculation means or corrected image information obtained by said digital image information correction means, as magnetic information.

5. A photographic film inspection apparatus according to claim 1, further comprising transmission means for transmitting exposure conditions calculated by said exposure condition calculation means and corrected digital image information provided by said digital image information correction means to a printer which prints images through exposure.

6. A photographic film inspection apparatus according to claim 5, wherein said transmission means is an on-line or in-line connection.

7. A photographic film inspection apparatus according to claim 5, wherein said transmission means is a recording medium.

8. A photographic film inspection apparatus according to claim 1, further comprising an image processing function and display means for displaying a positive image on the basis of exposure conditions calculated by said exposure condition calculation means and corrected image information provided by said digital image information correction means.

9. A photographic film inspection apparatus according to claim 8, wherein said image processing function includes an operation key for changing the exposure conditions, whereby the positive image displayed on said display means is corrected through operation of said operation key.

10. A photographic film inspection apparatus for inspecting an elongated developed photographic film before it undergoes exposure in order to obtain appropriate exposure conditions for the exposure in which light is irradiated onto a photosensitive material through said elongated developed photographic film, thereby reproducing on the photosensitive material images recorded on said elongated developed photographic film, said photographic film inspection apparatus comprising:

transport means for transporting said elongated developed photographic film along the longitudinal direction thereof and for positioning each picture frame of said developed photographic film at a predetermined portion;

exposure condition reading means for reading from said developed photographic film information regarding exposure conditions necessary for exposure including information regarding each picture frame while said developed photographic film is being transported by said transport means and while each picture frame is being positioned at said predetermined position;

digital image information capturing means for dividing an image recorded on each picture frame, which has been positioned at said predetermined position by said transport means, into a plurality of pixels and for capturing them so as to output digital data representing the captured image;

image presence/absence detection means for detecting whether or not an image is recorded in a predetermined photographable area of said developed photographic film while said developed photographic film is being transported by said transport means;

exposure condition calculation means for calculating exposure conditions used during exposure based on the exposure condition information read by said exposure condition reading means; and digital image information correction means for correcting the digital image information so as to permit images captured by said digital image information capturing means to be properly reproduced on the photosensitive material though exposed under standard exposure conditions.

11. A photographic film inspection apparatus according to claim 10, wherein said developed photographic film is provided with a magnetic recording layer on which said exposure conditions have been partially recorded as magnetic information, and said exposure condition reading means comprises magnetic information reading means for reading out the magnetic information while said developed photographic film is being transported by said transport means.

12. A photographic film inspection apparatus according to claim 10, wherein said developed photographic film is provided with a magnetic recording layer, and magnetic recording means is further provided so as to record on the magnetic recording layer at least either exposure conditions calculated by said exposure condition calculation means or corrected image information obtained by said digital image information correction means, as magnetic information, while said developed photographic film is being transported by said transport means.

13. A photographic film inspection apparatus according to claim 11, wherein said developed photographic film is provided with a second magnetic recording layer, and magnetic recording means is further provided so as to record on the second magnetic recording layer at least either exposure conditions calculated by said exposure condition calculation means or corrected image information obtained by said digital image information correction means, as magnetic information, while said developed photographic film is being transported by said transport means.

14. A photographic film inspection apparatus according to claim 10, further comprising transmission means for transmitting exposure conditions calculated by said exposure condition calculation means and corrected digital image information provided by said digital image information correction means to a printer which prints images through exposure.

15. A photographic film inspection apparatus according to claim 14, wherein said transmission means is an on-line or in-line connection.

16. A photographic film inspection apparatus according to claim 15, wherein said transmission means is a recording medium.

17. A photographic film inspection apparatus according to claim 10, further comprising an image processing function and display means for displaying a positive image on the basis of exposure conditions calculated by said exposure condition calculation means and corrected image information provided by said digital image information correction means.

18. A photographic film inspection apparatus according to claim 17, wherein said image processing function includes an operation key for changing the exposure conditions, whereby the positive image displayed on said display means is corrected through operation of said operation key.

19. A photographic film inspection apparatus according to claim 13, wherein said transport means has a structure so as to transport said developed photographic film in a first direction along the longitudinal direction of said developed photographic film and in a second direction opposite to said first direction, said magnetic information being read out from said magnetic recording layer by said magnetic information reading means while said developed photographic film is being transported in said first direction, and recording on said second magnetic recording layer being performed by said magnetic recording means while said developed photographic film is being transported in said second direction.

* * * * *